United States Patent [19]

Fitzgerald

[11] 4,247,695

[45] Jan. 27, 1981

[54] PROCESS FOR PREPARATION OF QUINACRIDONE PIGMENTS USING MODERATELY CONCENTRATED ACID

[75] Inventor: Patrick H. Fitzgerald, Edison, N.J.

[73] Assignee: E. I. Du Pont de Nemours and Company, Wilmington, Del.

[21] Appl. No.: 15,535

[22] Filed: Feb. 26, 1979

[51] Int. Cl.³ .............................................. C09B 48/00
[52] U.S. Cl. ...................................... 546/49; 546/56; 546/57; 106/288 Q
[58] Field of Search ........................... 546/49, 56, 57; 106/288 Q

[56] References Cited

U.S. PATENT DOCUMENTS

| | | | |
|---|---|---|---|
| 3,017,414 | 1/1962 | Minnich et al. | 546/49 |
| 3,030,370 | 4/1962 | Jackson | 546/49 |
| 3,051,720 | 8/1962 | Minnich | 260/314.5 |
| 3,326,918 | 6/1967 | West | 546/49 |
| 3,362,957 | 1/1968 | West | 546/49 |
| 3,697,464 | 10/1972 | Giambalvo et al. | 546/49 |
| 4,015,998 | 4/1977 | Jaffe | 106/288 Q |
| 4,024,148 | 5/1977 | Tyson et al. | 546/49 |
| 4,088,506 | 5/1978 | Wetzel | 106/288 Q |
| 4,094,699 | 6/1978 | Fitzgerald | 106/288 Q |

FOREIGN PATENT DOCUMENTS 2034499 2/1971 Fed. Rep. of Germany ............. 546/49

OTHER PUBLICATIONS

Takagi, et al., Chemical Abstracts, vol. 77, 128029Y (1972).

*Primary Examiner*—Jose Tovar
*Assistant Examiner*—Diana, G. Rivers

[57] ABSTRACT

A process for preparing beta or gamma crystals of linear quinacridone, substituted quinacridone or solid solutions thereof by contacting premilled quinacridone with 45–60% by weight sulfuric acid and 0–10% by weight of a surfactant based on the quinacridone at a weight ratio of acid to quinacridone of 3:1–6:1 to form a slurry, agitating said slurry for a period of time at 45°–75° C., adding water to form a dilute slurry, agitating said dilute slurry for a period of time at 75°–95° C. and separating quinacridone from the liquid of the dilute slurry.

17 Claims, No Drawings

PROCESS FOR PREPARATION OF QUINACRIDONE PIGMENTS USING MODERATELY CONCENTRATED ACID

DESCRIPTION

1. Technical Field

This invention relates to a process for preparing in pigmentary form quinacridone, substituted quinacridone or solid solution thereof by contacting milled quinacridone with dilute acid. More specifically, this invention relates to a process for preparing in pigmentary form beta or gamma quinacridone, substituted quinacridone or solid solution thereof by a process wherein the quinacridone, after milling, is treated with 45–60% by weight sulfuric acid.

2. Background Art

It is well known in the art that quinacridones direct from synthesis, known as crude quinacridones, are not always suitable for use as pigments and must be further processed to develop appropriate pigmentary properties, e.g., particle size, strength, phase, etc. A commonly used process for converting crude quinacridone to pigmentary form involves milling the crude quinacridone with large quantities of inorganic salt, then acid extracting the resulting quinacridone pigment. While the salt-grinding process can produce satisfactory pigment, the total volume of the grinding elements and salt is so large that only a relatively small amount of pigment can be milled for each batch. Furthermore, disposal of the large amounts of salt solution which results from the extraction step creates potential pollution problems and adds considerably to the manufacturing costs.

Attempts to eliminate the use of salt in premilling crude quinacridone, as described, for example, in U.S. Pat. No. 2,857,400 and U.S. Pat. No. 3,017,414, involve milling crude quinacridone without salt and contacting the milled quinacridone with an organic liquid or an acidic aqueous slurry of organic liquid. The organic liquid is removed from the slurry and the resulting quinacridone pigment isolated. The amounts of organic liquid utilized in these processes are generally at least 30% by weight, based on the weight of the quinacridone being processed and, like the salt, can create expensive waste disposal problems.

It is also known from U.S. Pat. No. 3,697,464 to produce linear beta-quinacridone from crude linear quinacridone of random polymorphic form by forming a solution or partial solution of the quinacridone in 5–25 times the amount of quinacridone of 86–100% sulfuric acid containing an aryl sulfonic acid, mixing said solution with water and separating the product.

DISCLOSURE OF THE INVENTION

Now a process has been found for preparing beta or gamma linear quinacridone pigments, substituted quinacridone pigments and solid solutions thereof which comprises dry milling quinacridone, substituted quinacridone or mixtures thereof until the particle size is less than the desired size, mixing the dry milled product with sufficient 45–60% sulfuric acid to form a slurry at a temperature of 40°–75° C., agitating the slurry for at least 30 minutes, adding at least an equal volume of water to the slurry to form a dilute slurry, agitating the dilute slurry for at least 30 minutes at a temperature of 75°–95° C. and separating the quinacridone and the dilute liquid.

For the practice of this invention the term "premilled" quinacridone is intended to include crude quinacridone which has been dry milled with inert grinding elements, such as rods, balls, etc., without conditioning aids such as solvents or large amounts of salts. The conditions applicable to the premilling operation are well known in the art. For example, in the case preferred for the practice of the invention, the mill loading is substantially conventional for ball milling operations. The charge of grinding elements usually occupies about half of the volume of the mill and the crude quinacridone to be milled occupies considerably more than the voids between these elements so that the total charge in the mill is in the range of 60–65% of the total volume of the mill. Grinding elements most commonly used include steel rods, balls and nails. The milling time will vary depending upon the particular quinacridone being milled, the mill loading and the type of mill being used. A minimum of 16–20 hours is usually required, and this may be extended to as much as 25–30 hours.

The term "quinacridone" as used herein is intended to include linear quinacridone and substituted quinacridones and solid solution mixtures thereof, of the type described in U.S. Pat. Nos. 2,844,484; 2,844,485; 2,821,530; 2,844,581 and 3,160,510.

Crude quinacridone may be prepared by methods well known in the art. Crude quinacridone is generally in coarse form. The process of the present invention requires that the quinacridone be milled until the particle size is reduced below that desired in the final pigmentary product.

The preferred salt for milling of the crude quinacridone is aluminum sulfate. The amount of aluminum sulfate that may be used in milling may vary rather broadly. Generally, however, 10–100% by weight of aluminum sulfate based on the quinacridone, preferably 10–20% by weight are used. Amounts greater than 100% are operable but are not required.

The milled quinacridone is contacted with sufficient 45–60% by weight sulfuric acid to form a slurry with the quinacridone particles. At least a weight ratio of 3:1 of acid solution to pigment is required to form a slurry. Generally, a weight ratio of 3:1–6:1 of said acid to quinacridone is used. Preferably this ratio is 3.5:1–4:1.

The acid is a 45–60%, preferably 50–55% by weight sulfuric acid solution. Concentrations above 60% will give a product of quinacridone in the less desirable alpha crystalline form. At less than 40% sulfuric acid, crystal growth will be insufficient resulting in a weak, dull, unattractive product. The acid strength is insufficient to dissolve more than a fraction of the pigment. The undissolved crystals act as nucleating sites and preserve the beta and gamma phase. Thus, premilling is required.

Thus, the process of the present invention results in the preparation of the pigment of the invention in the beta or gamma form by contacting the premilled pigment with dilute sulfuric acid without the necessity of other additives.

The slurry temperature is generally 40°–75° C., preferably 65°–75° C. Higher temperatures are generally hazardous. Lower temperatures lead to duller pigment.

The slurry of acid and pigment is agitated or stirred for a period of at least 30 minutes. Sufficient time must be allowed for agitation to permit sufficient particle growth to occur. Generally, agitation for 30 minutes to 4 hours is sufficient. However, longer periods of agitation are operable. Periods of less than 30 minutes result in insufficient particle growth.

The volume of water for diluting the slurry must amount to at least the volume of the slurry. Lessor amounts result in pigment fines. Any amount equal to or greater than the volume of the slurry may be used. The use of an amount of water equal to the volume of the slurry is preferred.

Agitation of the dilute slurry at a temperature of 75°–95° C. must be for at least 30 minutes. The small amount of fine crystals precipitated in the dilution step must be allowed to develop sufficiently to reach the desired crystal size. Generally, agitation of the dilute slurry from 30 minutes to 8 hours at said temperatures will achieve the desired crystal growth.

Temperatures of the dilute slurry above 95° C. give problems of foaming and generally problems relating to boilup. Temperatures below 75° C. give a duller, weaker pigment.

Surfactants may be added to improve fluidity of the slurry and to improve pigment properties. However, surfactants are not required. It is preferred that a surfactant be used. The preferred amount of surfactant is 1–10% by weight based on the pigment. Thus, the amount of surfactant within the scope of this invention can be 0–10% by weight based on the pigment.

The surfactants may be cationic, anionic or nonionic. The preferred surfactant is cationic. Among the cationic surfactants, dimethyldicocoammonium chloride is preferred.

Representative examples of anionic surfactants include salts of sulfate esters of long chain aliphatic alcohols such as sodium lauryl sulfate and sodium salt of sulfo succinate dioctyl ester (Aerosol ® O.T.); cycloparafinic acids of 5–6 carbon atoms such as naphthenic acid; sodium salt of tetrahydroabietic acid (Dresinate ® X); salts of alkylbenzenesulfonic acid such as isopropylammonium salt of dodecylbenzenesulfonic acid.

Representative examples of nonionic surfactants include alkylphenoxypoly(ethoxy)ethanols such as nonylphenoxypolyethoxyethanol, octylphenoxypolyethoxyethanols and polyethoxynonylphenol.

Representative examples of cationic surfactants include fatty alkyl amines and their salts and quaternary ammonium compounds. Representative quaternary ammonium compounds include tetraalkylammonium compounds such as disoya dimethyl ammonium chloride, ditallow imidazolinium quaternary salt, cetyl trimethyl ammonium bromide, quaternized polyoxyethylene cocoamine, tallow trimethyl ammonium chloride, tetradecyl trimethyl ammonium chloride, dodecyl trimethyl ammonium chloride, hexadecyl trimethyl ammonium chloride, octadecyl trimethyl ammonium chloride and dimethyldicocoammonium chloride.

Thus, the process of the present invention provides a new way of finishing a premilled quinacridone without the use of a solvent and with minimal amounts of dilute sulfuric acid to achieve a product in the desired beta or gamma crystal phase.

The product quinacridone pigment of the present invention is more intense and more dispersible relative to the level of transparency than quinacridone pigments prepared by prior art processes.

EXAMPLES

The following examples are given to illustrate the invention. All parts are by weight unless otherwise specified.

EXAMPLE 1 (BEST MODE)

A mixture of 364 Kg of crude quinacridone, 91 Kg of crude 2,9-dimethylquinacridone and 91 Kg of aluminum sulfate was ball milled for 26 hours.

A solution of 44.1 Kg of 98% sulfuric acid and 1.36 Kg of dimethyldicocoammonium chloride in 40.9 Kg of water was brought to 70° C. To this solution was added 27.2 Kg of mill powder (above) and the slurry was stirred for 2 hours at 68°–72° C. The slurry was then pumped into 177.7 Kg of water heated to 78°–80° C. and stirred for 1½ hours. The slurry was then treated with quinacridone monosulfonic acid (3½% of pigment weight) and stirred at 78°–80° C. for a further 30 minutes. The product was then filtered, washed, dried and pulverized. The product was improved in intensity, transparency and dispersibility in thermosetting automotive enamel as compared to a product of similar composition prepared by salt milling with solvent.

EXAMPLE 2

To a solution of 124 g of 96% sulfuric acid and 3 g of polyethoxynonylphenol in 110 g of water at 70° C. was added 75 g of the mill powder from Example 1. The slurry was stirred at 68°–72° C. for 2 hours and diluted with 200 ml of water and poured into 500 ml of water and heated to 90°–93° C. The slurry was stirred for 2½ hours, filtered and dried. Product was an intense, dispersible, transparent, blue-shade red.

EXAMPLE 3

The procedure of Example 2 was followed except that 3.1 g of Witconate ® P-10-59 (Witco Chemical Co.), the isopropylamine salt of an alkylbenzenesulfonate, was used as surfactant. The product was the same as the product of Example 1 except that it was less transparent but more dispersible in oil-ink systems and had better heat stability in vinyl plastics than the product of Example 1.

EXAMPLE 4

The procedure of Example 2 was followed except that no surfactant was used. The product was an intense, light masstone, blue-shade red.

EXAMPLE 5

A mill powder was prepared by ball milling 181.7 Kg of 4,11-dichloroquinacridone and 272 Kg of quinacridone with 45.4 Kg of aluminum sulfate for 20 hours. Eighty-three grams of this mill powder was added to a solution of 3.75 g of dicocodimethylammonium chloride, 140 g of 96% sulfuric acid and 131 g of water at 70° C. The mixture was stirred for 2 hours and then poured into 850 ml of water and heated to 80° C. and stirred for 2 hours, filtered, washed and dried. The product was a transparent yellow-shade red.

EXAMPLE 6

A mill powder was prepared by ball milling 18.2 Kg of crude gamma-phase linear quinacridone with 3.6 Kg of aluminum sulfate for 20 hours. To a solution at 70° C. of 3.1 g of dicocodimethylammonium chloride and 124 g of 96% sulfuric acid in 109 ml of water was added 75 g of that mill powder. The mixture was stirred for 2 hours at 68°-72° C. and then poured into 500 ml of water and heated to 80° C. The mixture was stirred at 80° C. for 2 hours, filtered and washed. The product is a transparent, strong and intense gamma-phase quinacridone red.

EXAMPLE 7

A mill powder was prepared by ball milling 18.2 Kg of beta-phase crude linear quinacridone with 1.8 Kg of aluminum sulfate. To a solution at 55° C. of 3.5 g of dicocodimethylammonium chloride and 179 g of 96% sulfuric acid in 157 ml of water was added 77 g of this mill powder. The mixture was stirred for 2¼ hours at 47°-52° C. and then diluted with 400 ml of cold water and stirred 5 minutes. This slurry was then poured into 2000 ml of water and heated to 85° C. and stirred 100 minutes, then filtered, washed and dried. The product was a transparent, intense, very blue-shade violet quinacridone pigment.

INDUSTRIAL APPLICABILITY

The process of the present invention is useful in the preparation of the beta and gamma quinacridones described herein for automotive finishes. Automotive enamel paints with such quinacridones give a desirable intensity of color.

I claim:

1. A process for preparing beta or gamma linear quinacridone pigments, substitutued quinacridone pigments and solid solutions thereof which comprises dry milling linear quinacridone, substituted quinacridone or mixtures thereof until the particle size is less than the desired size, mixing the dry milled product with 0-10% by weight of a surfactant based on the pigment and 45-60% by weight sulfuric acid at a weight ratio of said acid solution to quinacridone of 3:1-6:1 to form a quinacridone slurry at a temperature of 40°-75° C., agitating the slurry for at least 30 minutes, adding at least an equal volume of water to the slurry to form a dilute slurry, agitating the dilute slurry for at least 30 minutes at a temperature of 75°-95° C. and separating the quinacridone pigment and the liquid of the dilute slurry.

2. The process of claim 1 wherein the sulfuric acid is 50-55% by weight.

3. The process of claim 1 wherein linear quinacridone and an substituted quinacridone are milled.

4. The process of claim 3 wherein the substituted quinacridone is 2,9-dimethyl quinacridone.

5. The process of claim 4 wherein the linear quinacridone/2,9-dimethyl quinacridone are 20%/80% by weight.

6. The process of claim 4 wherein the amount of surfactant is 1-10% by weight based on the quinacridone.

7. The process of claim 6 wherein the surfactant is dimethyldicocoammonium chloride.

8. The process of claim 1 wherein the amount of surfactant is 1-10% by weight based on the quinacridone.

9. The process of claim 8 wherein the surfactant is dimethyldicocoammonium chloride.

10. The process of claim 1 wherein 10-100% by weight of aluminum sulfate based on the quinacridone is dry milled with the quinacridone.

11. The process of claim 1 wherein 10-20% by weight of aluminum sulfate based on the quinacridone is dry milled with the quinacridone.

12. The process of claim 10 wherein the amount of surfactant is 1-10% by weight based on the quinacridone.

13. The process of claim 12 wherein the surfactant is dimethyldicocoammonium chloride.

14. The process of claim 13 wherein linear quinacridone and an substituted quinacridone are milled.

15. The process of claim 11 wherein the amount of surfactant is 1-10% by weight based on the quinacridone.

16. The process of claim 15 wherein the surfactant is dimethyldicocoammonium chloride.

17. The process of claim 16 wherein linear quinacridone and substituted quinacridone are dry milled.

* * * * *